United States Patent
Surovtsev

(10) Patent No.: US 9,352,178 B2
(45) Date of Patent: May 31, 2016

(54) METHODS AND EQUIPMENT FOR HYDROTHERMAL PROCESSING AND DISPOSAL OF HIGHLY TOXIC SUBSTANCES, WASTE AND METAL POWDERS

(71) Applicant: HYDROTHERMA SWISS ECOLOGICAL TECHNOLOGIES SA, Lausanne (CH)

(72) Inventor: Valeriy Surovtsev, Lausanne (CH)

(73) Assignee: HYDROTHERMA Swiss Ecological Technologies SA, Lausanne (CH)

(*) Notice: Subject to any disclaimer, the term of this patent is extended or adjusted under 35 U.S.C. 154(b) by 0 days.

(21) Appl. No.: 14/650,478

(22) PCT Filed: Dec. 6, 2013

(86) PCT No.: PCT/IB2013/060706
§ 371 (c)(1),
(2) Date: Jun. 8, 2015

(87) PCT Pub. No.: WO2014/087385
PCT Pub. Date: Jun. 12, 2014

(65) Prior Publication Data
US 2015/0321038 A1 Nov. 12, 2015

(30) Foreign Application Priority Data

Dec. 7, 2012 (EP) .................................... 12196156

(51) Int. Cl.
*A62D 3/20* (2007.01)
*B01J 19/24* (2006.01)
(Continued)

(52) U.S. Cl.
CPC . *A62D 3/20* (2013.01); *B01J 3/008* (2013.01); *B01J 4/002* (2013.01); *B01J 4/02* (2013.01);
(Continued)

(58) Field of Classification Search
CPC ...................................................... A62D 3/20
USPC ................................. 588/312, 317, 320, 321
See application file for complete search history.

(56) References Cited

U.S. PATENT DOCUMENTS 6,150,580 A 11/2000 Janikowski

FOREIGN PATENT DOCUMENTS

| EP | 1 050 511 | 11/2000 |
| WO | WO 94/18128 | 8/1994 |

OTHER PUBLICATIONS

International Search Report for PCT/IB2013/060706, mailed Mar. 19, 2014, 3 pages.
(Continued)

*Primary Examiner* — Edward Johnson
(74) *Attorney, Agent, or Firm* — Nixon & Vanderhye P.C.

(57) ABSTRACT

A method of hydrothermal processing of highly toxic substances, wastes and metal powders, comprises a batch processing cycle of at least following steps i. to viii: i. preparing a batch of highly toxic waste, substances and metal powders for processing; ii. applying precision dozing to the batch to obtain a mixture of the batch with water and at least one additional reagent in preset proportions; iii. feeding the mixture into a reactor; iv. spraying the mixture inside the reactor with a mechanical spray nozzle; v. supplying an additional oxidizing agent inside the reactor; vi. adjusting a temperature inside the reactor to above 374.2° C.; vii. adjusting a pressure inside the reactor to above 21.8 MPa, thereby driving the water into supercritical condition and initiating a supercritical hydrothermal oxidation process; and viii. keeping the mixture in the reactor for a preset amount of time, and at the same time. The method further comprises removing a produced steam and hydrogen mixture from the reactor via a steam-gas unit and droplet separator into a wastewater condenser unit and a gas drainage pipe, and venting suspended solids through a bottom part of the reactor into a solids collector unit. The method then provides the steps of repeating the batch processing cycle after it has terminated; and monitoring and controlling the temperature and pressure inside the reactor via an Automatic Process Control System (APCS) during all steps.

17 Claims, 5 Drawing Sheets

(51) Int. Cl.
*B01J 3/00* (2006.01)
*B01J 4/00* (2006.01)
*B01J 4/02* (2006.01)
*A62D 101/02* (2007.01)

(52) U.S. Cl.
CPC ............ *B01J 19/24* (2013.01); *A62D 2101/02* (2013.01); *B01J 2219/00029* (2013.01); *B01J 2219/00031* (2013.01); *B01J 2219/00038* (2013.01); *B01J 2219/00051* (2013.01); *B01J 2219/00123* (2013.01); *B01J 2219/00135* (2013.01); *B01J 2219/00155* (2013.01); *B01J 2219/24* (2013.01); *Y02P 20/544* (2015.11)

(56) References Cited

OTHER PUBLICATIONS

Written Opinion of the ISA for PCT/IB2013/060706, mailed Mar. 19, 2014, 8 pages.
Reply to Written Opinion for PCT/IB2013/060706, dated Jan. 20, 2015, 9 pages.
Written Opinion of the IPEA, for PCT/IB2013/060706, 3 pages.
Reply to Written Opinion of the IPEA for PCT/IB2013/060706, dated Jan. 20, 2015, 4 pages.
International Preliminary Report on Patentability for PCT/IB2013/060706, dated Feb. 18, 2015.
Wellig, "Transpiring Wall Reactor for Supercritical Water Oxidation", 2003, 311 pages.

METHODS AND EQUIPMENT FOR HYDROTHERMAL PROCESSING AND DISPOSAL OF HIGHLY TOXIC SUBSTANCES, WASTE AND METAL POWDERS

This application is the U.S. national phase of International Application No. PCT/IB2013/060706 filed 6 Dec. 2013 which designated the U.S. and claims priority to EP Patent Application No. 12196156.9 filed 7 Dec. 2012, the entire contents of each of which are hereby incorporated by reference.

TECHNICAL FIELD

The invention relates to technologies and equipment for environmentally clean and energy efficient processing of a wide range of highly toxic substances, waste and metal powders through their full, single-stage hydrothermal oxidation.

In a specific application, the invention relates to methods for producing aluminum hydroxide of boehmite form, namely to methods for producing the boehmite of metal aluminum by oxidation in an aqueous medium. The boehmite is used in various fields of industry as an adsorbent, catalyst, etc. The boehmite of high purity is used in the electronics and optical industries in the form of fine powder—as abrasive powders, in particular for hard disks or magnetic heads.

BACKGROUND OF THE INVENTION

It is known that processing, disposal and/or destruction of highly toxic waste and substances are done using the following methods:
  thermal: burning in air media; plasma-chemical;
  chemical: neutralization and chemical reduction;
  biological; using special species of anaerobic and aerobic microorganisms (U.S. Pat. No. 5,196,949A).

The abovementioned methods and technologies for processing and destroying highly toxic substances are complicated, expensive, unsafe and not universal.

Researchers and developers are constantly seeking new engineering and technological solutions for deactivation of toxic substances and waste. Processes of hydrothermal oxidation of organic and inorganic substances in nearly critical and supercritical fluids have been actively studied in the past few years. With the temperature exceeding 374.2° C. and the pressure exceeding 21.8 MPa water transforms into a supercritical substance which is called a fluid. Under those conditions water receives special properties which differ from those of its liquid and gaseous phases. Water turns from a polar fluid into a non-polar fluid and can dissolve hydrophobic chemical compounds. However, at the same time water cannot dissolve many inorganic alkalis. Supercritical water has unlimited thermodynamic compatibility with organic compounds and oxygen, the diffusion speed increases while the oxidizing ability sharply increases. The speed of organic substance oxidation reactions in supercritical fluids is comparable with the speed of similar reactions during the burning of fuels in air media with the combustion front temperature of 2.300 to 2.800 K.

We know the methods of conducting oxidation processes for various classes of organic compounds in supercritical fluid and reactors in which these reactions take place [P. E. Savage, S. Gopalan. T. I. Mizan, Ch. J. Martino, E. E. Brock. Reactions at supercritical conditions: Applications and fundamentals. AIChE Journal, 1995, 41, 1723-1778; U.S. Pat. No. 5,723,045, Mar. 3, 1998].

The main way of industrial production of aluminum hydroxides is the Bayer process and their subsequent drying and calcination brings to production of aluminum oxide. However, conventional methods for producing aluminum hydroxide do not provide achievement of high purity (and structure homogeneity) of the product.

A method of producing aluminum in the form of boehmite ($\gamma$ AlO(OH)) is known (U.S. Pat. No. 2,758,011, cl. 423-627, Universal Oil Products Co, pub. Aug. 7, 1956 20] which comprises the reaction being carried out in an autoclave where the water and aluminum in the form of fine particles are loaded. Then mixture is heated to a temperature of 482-705° F. (250-374° C.) after which stirring is started at the same temperature under a pressure sufficient to maintain water in the liquid phase. The process is conducted for a time sufficient to interaction of aluminum. In the given examples, the time is about 4 hours. Once all the aluminum has reacted, the stirring is stopped, the autoclave with reaction mixture is cooled, and the resulting aluminum hydroxide is separated. Installation for carrying out the process comprises a reactor with a stirrer, a water inlet and powdered aluminum openings, a sump, a condenser for receiving the vapor gas. Such method on a commercial scale is not technological because of its periodic mode, a method does not allow to produce boehmite and hydrogen with the necessary intensity for industrial applications.

A method of producing aluminum hydroxide is known [U.S. Pat. No. 5,225,229, Cl. 423/629, Aluminum Company of America, pub. Jun. 7, 1993] in which aluminum is in the reaction with water in the liquid phase at a pH of about 12.4. At this pH aluminum hydroxide is produced at an acceptable rate for particles with a specific surface area value from 20000 $mm^2/g$ to 75000 $mm^2/g$. In accordance with another type of method to this patent, an organic compound—chlorin is added into the water as a catalyst. A disadvantage of the method is the need to raise the pH, which is achieved by adding a substantial amount of substances providing such a high pH. This method does not provide the desired product purity. Furthermore, the process proceeds at an insufficient rate.

A method of producing gaseous hydrogen is known [U.S. Pat. No. 6,638,493, Cl. 423/657, Andersen, et al., pub. 28 Oct. 2003], which comprises reacting aluminum with water in the presence of sodium hydroxide as a catalyst. In accordance with one aspect of the invention, the process comprises the following steps: creating of an aqueous alkaline solution in the reactor containing from 0.26 M to 19 M NaOH (mole concentration, M), the following step is the molar reaction of aluminum with water on the surface of the solution, while the sludge is lowered from the area of fluidized bed to the bottom of reactor, which prevents the mixing of sludge with the aluminum in the reactor. Since the reaction occurs in a fluidized bed on the surface of the solution, the most part of the reactor volume is not used in the reaction, which determines the lack of efficiency of the process of hydrogen. High levels of NaOH in the resulting aluminum hydroxide in this way considerably complicate its implementation as a commercial product that does not allow reducing the cost of the process.

The main setbacks of these methods are low speeds of chemical reactions and low conversion factors.

Inventions proposing oxidation of various substances and wastes in supercritical fluid in flow-through high-pressure reactors [WO 91/11394, Aug. 8, 1991; U.S. Pat. No. 5,558,783, Sep. 24, 1996; U.S. Pat. No. 5,591,415, Jan. 7, 1997; U.S. Pat. No. 6,264,844, Jul. 24, 2001] are the closest options. They use air, oxygen, oxygen-containing gas, hydrogen peroxide, nitric acid and perchlorate as oxidizing agents. Limited time for contact between reacting agents leading to low conversion factors is the disadvantage of these reactors.

In a specific realisation, the invention is aimed to provide a process for the continuous producing of chemically pure, fully crystallized by its structure aluminum hydroxide—boehmite (AlO(OH)), and hydrogen using aluminum powder having a particle size up to 60 microns. Such technical problems as increasing the reliability and stability of work of the reactor are solved.

The essence of the method for producing the nanocrystalline aluminum hydroxide in the form of boehmite and hydrogen, comprising preparing a slurry of powdered aluminum in the water, creating a pressure and temperature of saturated water vapor in the reactor corresponding to the conditions of intensive oxidation of aluminum, spraying the slurry in the reactor, output of mixture of water vapor and hydrogen from the reactor, and the output of boehmite from the reactor to the receiving device is that, when preparing the slurry of powdered aluminum in water, it comprises the catalyst—an alkali metal hydroxide in an amount of not more than 0.1 M (M—molar concentration), and after spraying the slurry prior to output of boehmite from the reactor allowance of the slurry to final oxidation of aluminum and the crystallization of the boehmite is carried out.

Furthermore, a process for producing nanocrystalline aluminum hydroxide in the form of boehmite and hydrogen is proposed, wherein for obtaining the continuity of the process of boehmite and hydrogen at least one auxiliary reactor is used, wherein during spraying the slurry in one of the reactors at least in one of other reactors additional oxidation of aluminum, the crystallization of boehmite are performed and output of boehmite is produced.

SUMMARY OF INVENTION

Among advantageous technical outcomes of the present invention are that it is environmentally clean, power efficient processing of a wide range of highly toxic substances, waste and metal powders through their full, single-stage hydrothermal oxidation without producing new highly toxic and combustible products, including the stage of decontaminating chloroorganic compounds, as well as full deactivation of flue gases discharged into the atmosphere. The processing according to the inventive method may cover utility, agricultural etc. liquid discharges containing wastes produced by the oil processing, chemical, paper, food, biological and pharmaceutical industries. The inventive method may be successfully used for destroying chemical weapons, missile fuel wastes, explosives and other toxic wastes, as well as for processing metallic powders into nanostructure metal oxides and hydroxides.

The general process of the hydrothermal processing of highly toxic substances, wastes and metal powders is as follows: a batch of highly toxic waste, substances and metal powders is prepared for processing. Using precision dozing pumps the batch is mixed with water and additional reagents in preset proportions and fed into the reactor. Inside the reactor the mixture is sprayed by means of a mechanical spray nozzle, then an additional oxidizing agent is supplied, the temperature is increased above 374.2° C. and the pressure above 21.8 MPa to drive the water into supercritical condition. The mixture is kept in the reactor for a preset amount of time, while the produced steam and hydrogen mixture is removed via a steam-gas unit and droplet separator into the wastewater condenser unit and the gas drainage pipe, while suspended solids are being vented through the bottom part of the reactor into the solids collector unit. When a batch of toxic substances has been processed the cycle continues all over. The temperature and pressure inside the reactor are monitored and controlled via an Automatic Process Control System (APCS).

Besides, we propose a method for hydrothermal processing of highly toxic substances, waste and metal powders when additional reagents or water are added to the prepared reactor feed thus turning them into a suspension, or emulsion, or a solution.

Besides, we propose a method for hydrothermal processing of highly toxic substances, waste and metal powders when alkali solutions are added as additional reagents to the reactor feed in order to bind acid products produced during the supercritical hydrothermal oxidation process.

Besides, we propose a method for hydrothermal processing of highly toxic substances, waste and metal powders when air or hydrogen peroxide, or an air/hydrogen peroxide mixture are added to the feed as an additional oxidizing agent.

Besides, we propose a method for hydrothermal processing of highly toxic substances, waste and metal powders when the feed is constantly fed into the reactor together with additional reagents and water, and an additional oxidizing agent is fed into the reactor and the steam-gas mixture is constantly discharged.

Besides, we propose a method for hydrothermal processing of highly toxic substances, waste and metal powders when the resulting steam and gas mixture being discharged via the combined cycle unit in order to obtain electrical and thermal power.

Besides, we propose a method for hydrothermal processing of highly toxic substances, waste and metal powders when the suspended solids are discharged from the bottom part of the reactor and collected in the solids collector unit.

Besides, we propose a methods for producing aluminum hydroxide of boehmite form, namely to methods for producing the boehmite of metal aluminum by oxidation in an aqueous medium. The boehmite is used in various fields of industry as an adsorbent, catalyst, etc. The boehmite of high purity is used in the electronics and optical industries in the form of fine powder—as abrasive powders, in particular for hard disks or magnetic heads.

An other aspect of the method relates to the production of hydrogen, namely, to methods for producing hydrogen by chemical reaction of metals and water. Hydrogen can be used in various chemical processes as a reducing agent, and in certain conditions as fuel.

According to a first aspect, the invention provides a method of hydrothermal processing of highly toxic substances, wastes and metal powders. The method comprises a batch processing cycle of at least following steps i. to viii.
  i. preparing a batch of highly toxic waste, substances and metal powders for processing;
  ii. applying precision dozing to the batch to obtain a mixture of the batch with water and at least one additional reagent in preset proportions;
  iii. feeding the mixture into a reactor;
  iv. spraying the mixture inside the reactor with a mechanical spray nozzle;
  v. supplying an additional oxidizing agent inside the reactor;
  vi. adjusting a temperature inside the reactor to above 374.2° C.;
  vii. adjusting a pressure inside the reactor to above 21.8 MPa, thereby driving the water into supercritical condition and initiating a supercritical hydrothermal oxidation process;

viii. keeping the mixture in the reactor for a preset amount of time, and at the same time The method further comprises removing a produced steam and hydrogen mixture from the reactor via a steam-gas unit and droplet separator into a wastewater condenser unit and a gas drainage pipe, and venting suspended solids through a bottom part of the reactor into a solids collector unit. The method then provides the steps of repeating the batch processing cycle after it has terminated; and monitoring and controlling the temperature and pressure inside the reactor via an Automatic Process Control System (APCS) during all steps.

In a first preferred embodiment the mixture of processed substances comes as a suspension, emulsion or solution.

In a second preferred embodiment an alkali solution is added as the at least one additional reagent to the reactor, in order to bind an acid product produced during the supercritical hydrothermal oxidation process.

In a third preferred embodiment, air or hydrogen peroxide, or an air/hydrogen peroxide mixture is supplied as the additional oxidizing agent.

In a fourth preferred embodiment, the steps of feeding the mixture together with the at least one additional reagent and the water, the supplying of the additional oxidizing agent and the removing of the produced steam and hydrogen mixture are constantly performed.

In a fifth preferred embodiment, the method further comprises the resulting steam and gas mixture being discharged via the combined cycle unit in order to obtain electrical and thermal power.

In a sixth preferred embodiment, the method is further characterised in that the batch of highly toxic waste, substances and metal powders is a batch of powdered aluminium and the at least one additional reagent is an alkali metal hydroxide in a preset proportion not more than 0.1 M.

In a second aspect, the invention provides an equipment for hydrothermal processing of highly toxic substances, waste and metal powders, that comprises a reactor, an internal pipe located in the reactor, a top cover of the reactor, a bottom cover of the reactor opposite to the top cover, at least a first vessel with highly toxic substances and wastes, at least a second vessel with additional reagents, at least a third vessel with water, a plurality of dosage units, a mixer which is operationally connected to the plurality of dosage units for using the dosage units to prepare a mixture to be processed of highly toxic substances, wastes and metal powders, additional reagents and water, a feeding dosage pump which feeds the mixture under high pressure into the internal pipe, a mechanical nozzle configured to spray the mixture pumped into the internal pipe, a hydrogen peroxide vessel, a dozing pump connected to the hydrogen peroxide vessel to pump hydrogen peroxide into the reactor; a compressed air receiver for operating valves, and a second receiver which is used to supply air into the reactor through a nozzle located in the top cover of the reactor. A compressor pumps ambient air into the compressed air receiver and into the second receiver. A nipple is located in the top cover, for discharging a mixture of steam and gas. The equipment further comprises a combined cycle unit, and a droplet separator configured to separate a gas mixture into condensed water and a humid gas. The nipple is connected to the combined cycle unit and the droplet separator such that the mixture goes through a first valve and through the combined cycle unit and in the droplet separator where it is separated into condensed water which goes to a condensate collector and the humid gas mixture which is discharged through a drainage pipe into the atmosphere. The equipment further comprises a second nipple and a second valve located on the bottom cover, for removing suspended solids from the reactor and guiding the suspended solids to be collected in a solids collector unit. The droplet separator is further configured to discharge fumes that are separated from the suspended solids, into the atmosphere and condensates are collected in the condensate collector unit. The reactor is made to withstand temperatures above 374.2° C. and pressures above 21.8 MPa which allow water to enter the supercritical state. The equipment further being equipped with an Automated Monitoring and Control System (AMCS) which is configured to monitor a feed pressure, temperature and pressure inside the reactor, pump and valve operation.

In a seventh preferred embodiment, the mixture of processed substances comes as a suspension, emulsion or solution.

In a eighth preferred embodiment, the preset temperature and pressure inside the reactor are maintained by adding cold water to the reactor, stopping the process of feeding the mixture of feed and air or hydrogen peroxide in case the temperature or pressure exceed the preset values or heating the reactor by external electrical heaters if the temperature or pressure become too low.

In an ninth preferred embodiment the reactor has several internal pipes.

In a tenth preferred embodiment several reactors working in parallel are used to increase productivity.

In an eleventh preferred embodiment, the batch processing is started at a preset time interval in the several reactors working in parallel.

In a third aspect, the invention provides a reactor for hydrothermal processing of highly toxic substances, waste and metal powders. The reactor comprises a cylinder-shaped chamber with a top cover and a bottom cover attached to the cylinder through O-ring seals, at least one internal pipe located inside the chamber, in which hydrothermal processing of the highly toxic substances, the waste and the metal powders takes place, at least one nozzle for injecting the highly toxic substances, the waste and the metal powders, as well as an additional reagent and water inside the chamber, at least one further nozzle for feeding an additional oxidizing agent into the chamber, a first nipple for discharging gaseous products of the oxidizing process and a first temperature sensor installed in the top cover. The reactor further comprises a second nipple for discharging suspended solids, installed in the bottom cover and a second temperature sensor installed in the bottom. The top cover and bottom cover are equipped with thermal insulated housings. At least a heater is located on an outer surface of the chamber. The first and the second temperature sensors are located on the outer surface of the chamber.

In a twelfth preferred embodiment the mixture of processed substances comes as a suspension, emulsion or solution.

In a thirteenth preferred embodiment, air or hydrogen peroxide is pumped into the reactor as additional oxidizing agents.

In a fourteenth preferred embodiment, a air/hydrogen peroxide mixture is added to the feed as an additional oxidizing agent.

In a fifteenth preferred embodiment the reactor chamber has several internal pipes.

In a third aspect, the invention provides a method of production of crystalline aluminum hydroxyl as boehmite and hydrogen, the method comprising a batch processing cycle of at least following steps i. to vi.

i. preparing a batch of powdered aluminium for processing;
ii. applying precision dozing to the batch to obtain a mixture of the batch with water and not more than 0.1 M of anan alkali matal hydroxide;
iii. feeding the mixture into a reactor;
iv. spraying the mixture inside the reactor with a mechanical spray nozzle;
v. supplying an additional oxidizing agent inside the reactor;
vi. keeping the mixture in the reactor for a preset amount of time so that the slurry is allowed to a final oxidation of the aluminum and a crystallization of the boehmite and at the same time, and at the same time The method further comprises removing a produced steam and hydrogen mixture from the reactor via a steam-gas unit and droplet separator into a wastewater condenser unit and a gas drainage pipe, and venting suspended solids through a bottom part of the reactor into a solids collector unit. The method then provides the steps of repeating the batch processing cycle after it has terminated; and monitoring and controlling the temperature and pressure inside the reactor via an Automatic Process Control System (APCS) during all steps.

In a sixteenth preferred embodiment at least one auxiliary reactor is used for a continuous process. the method provides the step of spraying the slurry altenatively in the high pressure reactor and the auxiliary reactors at an interval of time equal or longer to the preset amount of time.

In a seventeenth preferred embodiment the temperature is in a range of 300° C. to 650° C.

In an eighteenth preferred embodiment the pressure is in a range of 10 to 17 MPa.

BRIEF DESCRIPTION OF THE FIGURES

The invention will be better understood from the following description of preferred embodiments and by means of the appended drawings, in which.

DETAILED DESCRIPTION OF PREFERRED EMBODIMENTS OF THE INVENTION

Figure 1:
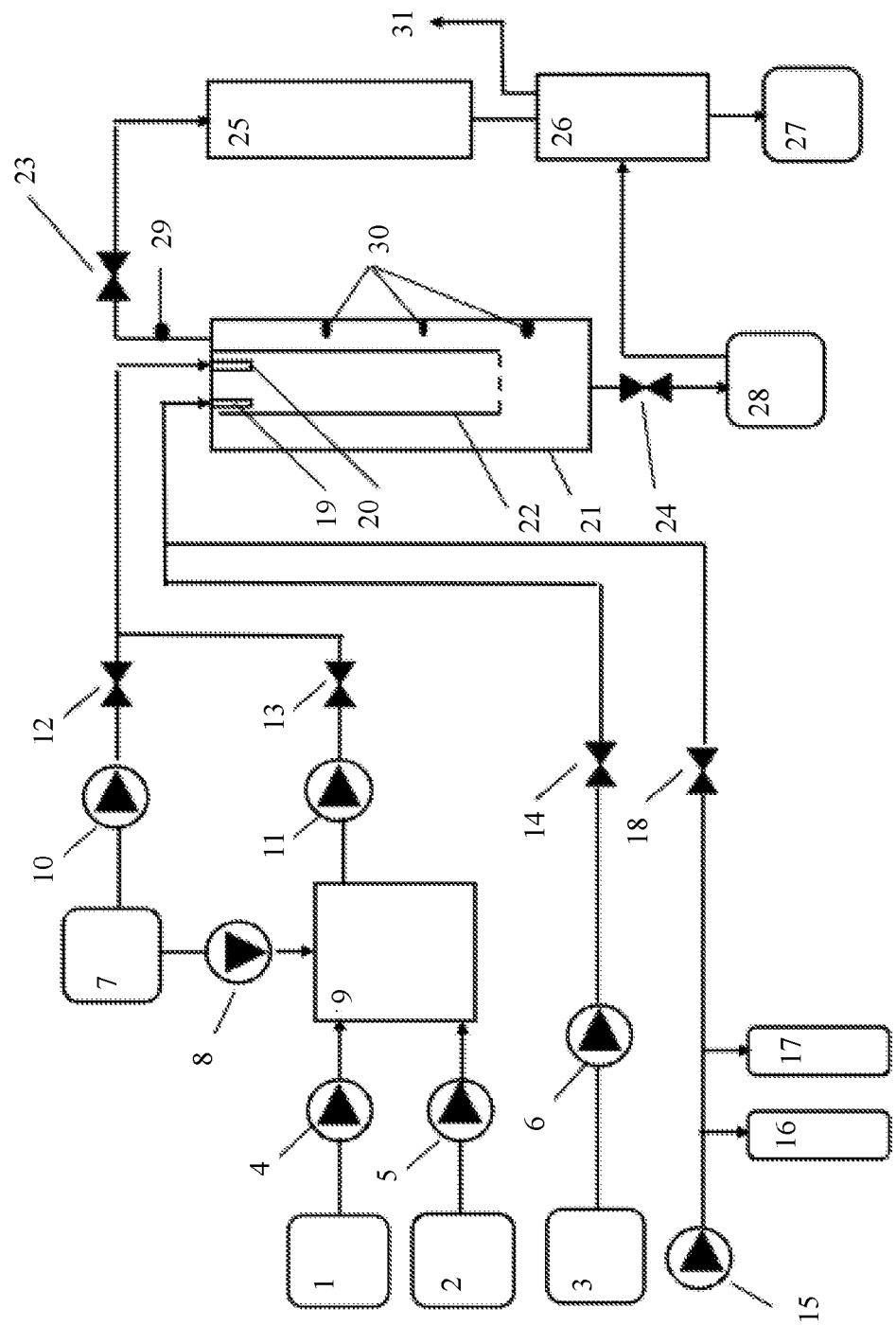
FIG. 1 shows a schematic structural functional diagram of a unit for hydrothermal processing of highly toxic substances, waste and metal powders according to an example embodiment of the invention.

Following numeral references are used in the drawings associated to the features as indicated:
1. Vessel for processed substances;
2. Vessel for additional reagents;
3. Vessel with hydrogen peroxide;
4. Dozing unit for feeding the processed substances into the mixer;
5. Dozing unit for feeding additional reagents into the mixer;
6. Dozing pump for feeding hydrogen peroxide into the reactor;
7. Vessel for water;
8. Dozing pump for feeding water into the mixer;
9. Mixer;
10. Dozing pump for feeding water into the reactor;
11. Dozing unit for feeding the processed substances into the reactor;
12. Water supply to the reactor cutoff valve;
13. Processed substances and water mixture supply to the reactor cutoff valve;
14. Hydrogen peroxide supply to the reactor cutoff valve;
15. Air compressor;
16. Receiver for supplying compressed air to the reactor;
17. Receiver for supplying compressed air to valves and cutoff equipment;
18. Compressed air supply to the reactor cutoff valve;
19. Nozzle for feeding compressed air and hydrogen peroxide to the reactor;
20. Nozzle for feeding processed substances and water mixture to the reactor;
21. Reactor;
22. Internal pipe of the reactor;
23. Gas and steam mixture discharge cutoff valve;
24. Suspended solids discharge cutoff valve;
25. Combined Cycle Unit;
26. Droplet separator;
27. Condensate collector;
28. Solids collector;
29. Pressure sensor;
30. External temperature sensors;
31. Drainage pipe;
32. Reactor chamber cylinder;
33. Top cover of the reactor chamber;
34. Bottom cover of the reactor chamber;
35. Thermal insulated housings;
36. Processed substance feeding nipple;
37. Oxidizer feeding nipple;
38. Suspended solids discharge nipple;
39. Gas and steam mixture discharge nipple;
40. Electric heaters;
41. Internal temperature sensor;
42. Internal temperature sensor;
43. Adjustable source of slurry of powdered aluminum with water;
44. Capacitor;
45. Receiving node;
46. Adjustable valve for feed of slurry;
47. Adjustable diverter valve for boehmite;
48. Means for feeding slurry to the reactor;
49. Process controller;
50. Input of the process controller;
51. Output of the process controller;
52. Adjustable means for supplying water;
53. Adjustable means for supplying the powder of aluminum;
54. Means for supplying catalyst;
55. Adjustable diverter valve for steam-hydrogen mixture;
56. Additional reactor;
57. Additional adjustable diverter valve for boehmite;
58. Additional adjustable supply valve for slurry to an additional reactor; and
59. Additional adjustable diverter valve for steam-hydrogen mixture.

The following acronyms are used throughout the description:
APCS: Automatic Process Control System;
SCHO: Supercritical Hydrothermal Oxidation.

Figure 2:
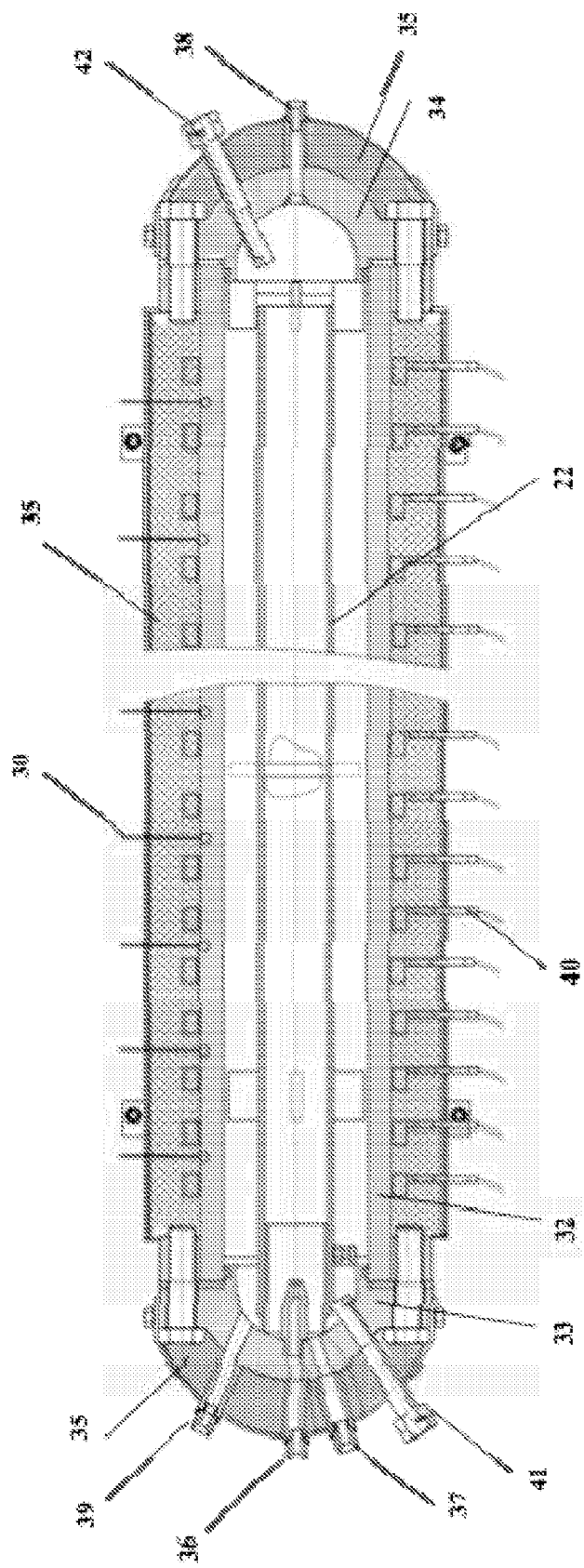
FIG. 2 a structural diagram of a reactor according to the invention.

The proposed equipment unit for hydrothermal processing of highly toxic substances, waste and metal powders generally comprises the following features, which are shown in FIGS. 1 and 2:
- a reactor 21;
- at least a first vessel with highly toxic substances and wastes 1, a second vessel with additional reagents 2 and a water vessel with water 7;
- a mixer 9 and a plurality of dosage units 4, 5, and 8 for use with the mixer 9 to make a mixture of processed highly toxic substances, wastes and metal powders, additional reagents and water, which is then fed under high pressure into a reactor's internal pipe 22 via a feeding dosage pump 11 and sprayed with a mechanical nozzle 20;
- a hydrogen peroxide vessel 3 from which hydrogen peroxide is pumped by a dozing pump 6 into the reactor 21;
- a compressor 15 which pumps ambient air into a compressed air receiver 17 for operating valves and into an other receiver 16 which is used to supply air into the reactor 21 through a nozzle 19 located in a reactor's 21 top cover 33 (not shown in FIG. 1, but illustrated in FIG. 2);
- the upper cover 33 has a nipple 40 for discharging the steam and gas mixture;
- the mixture goes through a valve 23 and through a combined cycle unit 25 and in a droplet separator 26 where it is separated into condensed water which goes to a condensate collector 27 and a humid gas mixture which is discharged through a drainage pipe 31 into the atmosphere;
- suspended solids are removed from the reactor 21 via a nipple 39 (see FIG. 2) located on a reactor's 21 bottom cover 34 and a valve 24 (see FIG. 1), and are collected in a solids collector unit 28; fumes that were separated from the suspended solids are discharged into the atmosphere through the droplet separator 26 and condensates are collected in the condensate collector unit 27.

The reactor 21 is made to withstand temperatures above 374.2° C. and pressures above 21.8 MPa which allow water to enter the supercritical state.

The equipment unit is equipped with an Automated Monitoring and Control System (AMCS) (not shown in the figures) which monitors the feed pressure, temperature and pressure inside the reactor, pump and valve operation. Such AMCS is known from the art and may be implemented by a person skilled in the art without any difficulty.

In a preferred embodiment of the unit the preset temperature and pressure inside the reactor are maintained by adding cold water to the reactor, stopping the process of feeding the mixture of feed and air or hydrogen peroxide in case the temperature or pressure exceed the preset values or heating the reactor by external electrical heaters if the temperature or pressure become too low.

In an other preferred embodiment the unit makes use of a plurality of reactors operating in parallel with each reactor having several internal pipes in order to increase productivity.

In a further preferred embodiment. the reactor for hydrothermal processing of highly toxic substances, waste and metal powders 21 contains a cylinder-shaped chamber 32 with the top cover 33 and bottom cover 34 attached to the cylinder-shaped chamber 32 through O-ring seals (not shown in FIG. 2); inside the cylinder-shaped chamber 32 there is at least one internal pipe 22 where hydrothermal processing of highly toxic substances, waste and metal powders takes place, at least one nozzle 20 for injecting highly toxic substances, waste and metal powders, as well as additional reagents and water, at least one nozzle 19 for feeding the additional oxidizing agent; the nipple for discharging gaseous products of the oxidizing process 40 and a temperature sensor 41 installed in the top cover 33 of the reactor chamber 21; a nipple 39 for discharging suspended solids and a temperature sensor 42 installed in the bottom cover 34 of the reactor; the top cover 33 and bottom cover 34 of the reactor 21 are equipped each with a thermal insulated housing 35; the heaters 40 and temperature sensors 30 are located on an outer surface of the reactor chamber 21.

Turning now to the method underlying the hydrothermal processing of highly toxic substances, wastes and metal powders, this is done as explained in the following paragraph.

Water is pumped into the reactor 21 by means of the pump 10. The reactor 21 is heated to reach a temperature above 374.2° C. and a pressure within a range from 19.5 to 20.5 MPa, which is somewhat lower than 21.8 MPa, temperature above which water becomes supercritical. Highly toxic substances, wastes and metal powders to be processed and decontaminated are placed inside the vessel 1; a portion of highly toxic substances, wastes and metal powders is mixed with neutralizing agents and water in the mixer 9 and supplied to the reactor 21 where the mixture is sprayed by means of a mechanical nozzle. The oxidizing agent—air from the receiver 16 of hydrogen peroxide from the vessel 3 are at the same time fed into the reactor 21. When the reagents have been fed the temperature and pressure in the chamber rise to above 374.2° C. and 21.8 MPa correspondingly and water goes supercritical. The mixture of processed and decontaminated substances is kept inside the reactor 21 for a preset period of time with the resulting gas and steam mixture being discharged through the Combined Cycle Unit 25 and droplet separator 26 with further separation into condensed water which goes to the condensate collector 27 and humid gas mixture which is discharged to the atmosphere via the drainage pipe; suspended solids are discharged from the bottom part of the reactor into the solids collector 28.

The process is controlled as follows:

When the Reactor Works Periodically

The following parameters are downloaded into the APCS:
- time values for water and decontaminated substance mixture feed dozing pump operation;
- oxidizing agent dozing pump operation parameter;
- air pressure and air feeding time (in case air is used);
- initial and terminal pressure values in the reactor 21 for discharging gaseous reaction products;
- number of cycles between discharges of solid reaction products.

The APCS sends commands to the feed pump 11, hydrogen peroxide pump 6, air supply valve 18, gas and steam mixture discharge valve 23 and to the solids discharge valves 24. Preset values for temperature inside the reactor 21 are also downloaded into the APCS. When the temperature falls below the preset value, power is supplied to the heating elements 40 and if the temperature exceeds the preset value, the pump 10 starts feeding water into the reactor while feeding of the oxidizing agent and the feed is stopped.

When the Reactor Works Permanently

Preset values for temperature and pressure inside the reactor are loaded into the APCS. Dozing values of dozing pumps 4, 5, 6, 8 are adjusted in order to reach the required proportion of the processed substances to the oxidizing agent. The pump 11 and the pump 6 and/or a valve 18 for supplying water, processed substances and oxidizing agents are switched on. Temperature adjustment inside the reactor is done automatically. When the temperature drops below the preset value, power is supplied to the heating elements 40 and if the temperature exceeds the preset value the pump 10 starts feeding water into the reactor while feeding of the oxidizing agent and the feed is stopped.

The pumps 6, 11 are turned on automatically when the pressure inside the reactor 21 raises above the preset value. When the pressure drops below the preset value the gas and steam mixture discharge valves 23 are closed to be opened later when the required pressure is reached.

Method 1 Implementation Model

An example implementation according to a first example named method 1 herein will now be described.

Hydrothermal processing and deactivation of the chlorine-organic pesticide—simazine with air or hydrogen peroxide used as oxidizing agents is performed as follows:

$$4C_7H_{12}ClN_5 + 35O_2 + 4NaOH = 28CO_2 + 4NaCl + 28H_2O + 10N_2$$

$$2C_7H_{12}ClN_5 + 39H_2O_2 + 2NaOH = 14CO_2 + 2NaCl + 52H_2O + 5N_2$$

When processing was done in the cyclic mode with air used as the oxidizing agent: 150 n.l. of air and suspension, consisting of 5 g of simazine, 1 g of NaOH, 20 g of water were fed into the reactor containing water and water vapors at temperature in the range of 540 to 560° C. and pressure in the range of 19.5 to 20.5 MPa within a single cycle. Simazine oxidizing lasted for 50 seconds with the pressure in the reactor being in the range of 23 to 24 MPa and the temperature being in the range of 540 to 560° C. When the oxidizing process was finished gaseous reaction products were discharged until the pressure in the reactor dropped down to 15 MPa. The process was followed by feeding air into the reactor to increase the pressure up to the range of 19.5 to 20.5 MPa and by dozing the simazine suspension.

Solids were discharged to the collector once every 20 cycles.

When hydrogen peroxide was used as the oxidizing agent during cyclic operation the following feed was fed into the reactor each cycle: 5 g of simazine, 1 g of NaOH, 20 g of water and 150 ml of hydrogen peroxide (concentration 50%). Simazine oxidizing lasted for 50 seconds with the pressure in the reactor being in the range of 23 to 24 MPa and the temperature being in the range of 540 to 560° C. When the oxidizing process was finished gaseous reaction products were discharged until the pressure in the reactor dropped down to 15 MPa. The process was followed by feeding air into the reactor to increase the pressure up to the range of 20.5 to 21.5 MPa and by dozing the simazine suspension.

Solids were discharged to the collector once every 20 cycles.

The results of measurements to determine the products after deactivation are shown in the following tables 1 and 2.

TABLE 1

Results of solids analysis after simazine deactivation with air

| No. | Description | Unit | Value |
|---|---|---|---|
| 1 | Simazine | mg/dm$^3$ | not found |
| 2 | Ammonia Ion | mg/dm$^3$ | 6 |
| 3 | Nitrite Ion | mg/dm$^3$ | 0.3 |
| 4 | Hydrogen value | units pH | 5.7 |
| 5 | Suspended substances | mg/dm$^3$ | 280 |
| 6 | Total iron | mg/dm$^3$ | 108 |
| 7 | Chemical Consumption of Oxygen (CCO) | mgO$_2$/l | 48 |
| 8 | Sulphate Ion | mg/dm$^3$ | 48 |
| 9 | Nitrate Ion | mg/dm$^3$ | 1.8 |

TABLE 2

Results of solids analysis after simazine deactivation with hydrogen peroxide

| No. | Description | Unit | Value |
|---|---|---|---|
| 1 | Simazine | mg/dm$^3$ | not found |
| 2 | Ammonia Ion | mg/dm$^3$ | 12 |
| 3 | Nitrite Ion | mg/dm$^3$ | 0.4 |
| 4 | Hydrogen value | pH unit | 4.9 |
| 5 | Suspended substances | mg/dm$^3$ | 340 |
| 6 | Total iron | mg/dm$^3$ | 139 |
| 7 | Chemical Consumption of Oxygen (CCO) | mgO$_2$/l | 37 |
| 8 | Sulphate Ion | mg/dm$^3$ | 52 |
| 9 | Nitrate Ion | mg/dm$^3$ | 2.5 |

Method 2 Implementation Model

An first example implementation according to a second example named method 2 herein will now be described.

Hydrothermal processing and deactivation of an organic substance—dioxane with hydrogen peroxide used as oxidizing agents is performed as follows:

$$C_4H_8O_2 + 5H_2O_2 = 4CO_2 + 14H_2O$$

Preparation of reagents included preparation of a solution containing 90 g of dioxane and 250 g of hydrogen peroxide in 1 liter.

50 ml of the feed was fed into the reactor 21 during each cycle of the cyclic operation mode. Dioxane oxidizing reaction took 20 seconds at a pressure in the range of 23 to 24 MPa and a pressure in the range of 540 to 560° C. When the oxidation process was finished gaseous reaction products were discharged until the pressure in the reactor dropped down to 15 MPa. The process was followed by feeding air into the reactor to increase the pressure up to the range of 19.5 to 20.5 MPa and by feeding another batch of the feed.

When the process was run in the permanent operation mode a 0.4 mm orifice was installed in the gaseous reaction products discharge line. Water was pumped into the reactor prior to starting the process and put into supercritical state under 23 MPa and 550° C. This was followed by opening the feed supply valve and the gaseous products discharge valve as well as switching on the feed dozing pump. When the feed of the abovementioned quality was fed into the reactor at the speed of 5 ml/s in the permanent mode the pressure in the reactor was maintained within 23.0±0.4 MPa and the temperature within 540÷560° C.

The dioxane oxidation reaction does not produce solids. The liquid reaction product is partly vaporized (water) and discharged together with the gaseous CO$_2$ while the remaining part is sent to the recycled water system.

The proposed process is high-tech, highly productive, environmentally safe and power efficient.

The invention ensures full destruction of the organic part down to carbon oxide and water.

Nitrogen oxides and dioxins are not produced due to the relatively low reaction temperature.

The inventive process covers a wide range of organic substances, including those which are difficult to oxidize, as well as metals and organoelemental compounds.

The inventive process enables transformation of inorganic elements into disposable oxides and alkali.

After leaving the reactor the high quality gas and steam mixture (jet steam, carbon dioxide gas and nitrogen) are supplied to the Combined Cycle Unit for generating electric and thermal power.

At the same time the proposed hydrothermal technologies are:
- universal, as processed organic and inorganic waste and contaminants do not require preliminary separation;
- effective as the oxidation (deactivation) rate for major contaminants is up to 99.9%;
- economical as the process produces high thermal energy steam (P=230-270 atm, T=450-550° C.) and recycle water (water quality meeting the requirements of SanPin 2.1.5.980-00);
- safe, as the unit automatically stops operation in case of emergency without discharging processed substances and products.

Method 3 Production of Aluminum Hydroxide (Boehmite) and Hydrogen by Hydrothermal Oxidation An second example implementation according to a second example named method 3 herein will now be described.

Figure 3:
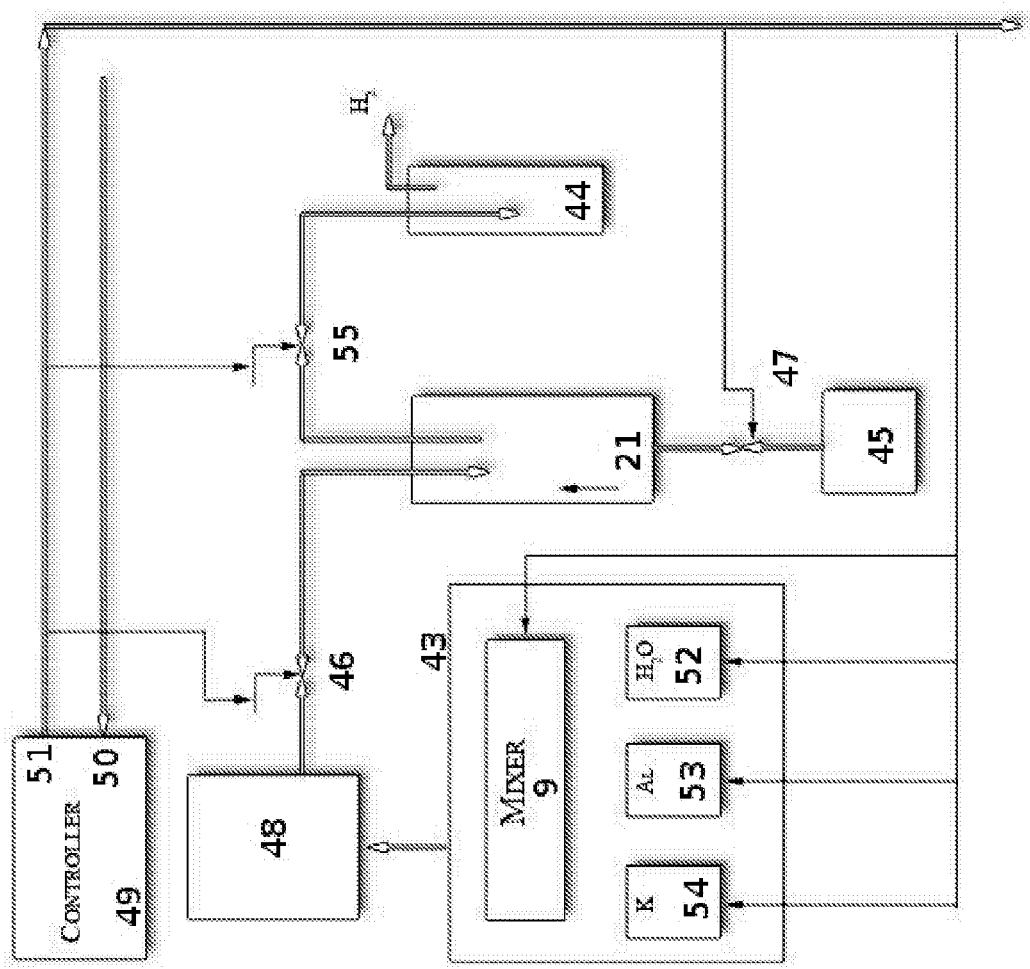
FIG. 3 is a block diagram of the process device with a single reactor according to a specific configuration of the invention.

The block diagram of the device in FIG. 3 shows an installation, comprising a reactor 21 which is connected with means 48 for feeding slurry to the reactor. Between the input of the reactor 21 and output of the means 48 for feeding slurry to the reactor the slurry supply adjustment valve 6 is included. Input of the means 48 of feeding the slurry to the reactor is connected with output of an adjustable source of slurry of powdered aluminum with water 43, which comprises a mixer 9 which is connected to the outputs of controlled water supply means 12, controlled by supply means of the aluminum 53 and adjustable supply means of catalyst 54. Output of the reactor 21 via an adjustable valve of outlet of steam-hydrogen mixture 55 is connected to the input of capacitor 44. Another outlet of the reactor 21 through an adjustable diverter valve for boehmite 47 is connected to the input of receiving node 45 of the boehmite collection receiver. Input 50 of the controller 49 is connected to pressure and temperature sensors (not shown in FIG. 3).

Figure 4:
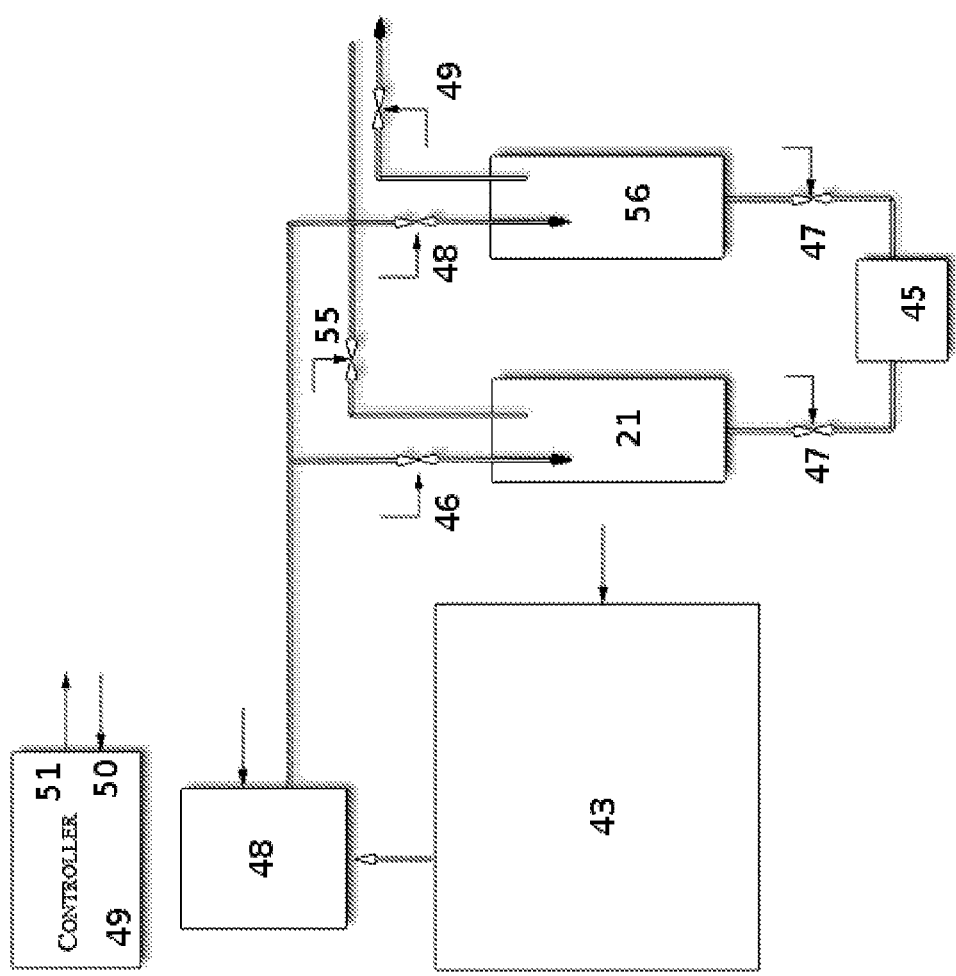
FIG. 4 is a block diagram of the process device with two reactors according to a specific configuration of the invention.

FIG. 4 shows a block diagram with additional reactor 56. Input of auxiliary reactor 56 via optional adjustable valve 58 is connected to the output of means 48 for feeding slurry to the reactor. Output of auxiliary reactor 56 of boehmite output via optional adjustable valve 57 is connected to the input of the receiver assembly 45. Another output of the auxiliary reactor 56 of discharge of steam-hydrogen mixture through the additional control valve 59 is connected to a condenser 44 (not shown in FIG. 4. Control inputs of additional adjustable valves 57, 58, 59 are connected to the output 51 of the controller 49 (these connections are not shown in FIG. 4.

As regulated water supply means 52 and the catalyst 54, for example, adjustable dosing pump can be used. Source of slurry 43 has adjustable means for supplying the aluminum powder 53, which is a screw doser with variable output. The means 48 for feeding slurry to the reactor comprises a membrane type metering pump 45. Mixer 9 is a stainless steel vessel equipped with a stirrer. Computer Controller 49 is connected to upper level computer, is not shown in FIG. 3.

Implementation of the Method 2

The reaction of aluminum metal powder with water according to the reaction $$2Al+4H_2O=2AlO(OH)+3H_2(g)+Q(kcal)$$

occurs at the fine atomization of slurry of aluminum powder with water at an adjusted ratio $Al/N_2O=1/7 \div 1/8$ from the source 43 to the reactor 48, which include water and its vapor at a temperature T=220-250° C. and pressure P=15-17 MPa. At this, the size of the droplets of injected slurry should be no more than 100 microns.

In preparing the slurry of aluminum powder with water, microadditive of soluble in water catalyst is introduced into its composition at no more than 0.1 M (molar concentration). The maximum amount of catalyst that is introduced into the mixer 9 is determined by the requirement of the absence of hydrogen emission in a mixer 9, which may be formed when a reaction between aluminum and water occurs, even at room temperature. At the temperature T=300-350° C. and pressure P=10-17 MPa in the reactor the rate of chemical reaction between aluminum and water in the presence of the catalyst increases significantly. The action of the catalyst is explained by the fact that because of its involvement unstable intermediates (activated complexes) aluminate ions $[Al(OH)^{4-}]_n (OH)_2^{-n-2}$ occur, whose decay results in the formation of reaction products. In this case, the activation energy of the reaction is reduced and, some molecules become active, whose energy is not sufficient to carry out the reaction in the absence of a catalyst. As a result, the total number of active molecules increases and the reaction rate increases. The values of measured by us specific rates of reaction between aluminum and water for aluminum powders of different sizes with the introduction of the initial components of the catalyst to the composition (e.g., NaOH) are shown in Table 3.

The specific rate of reaction of aluminum with water was evaluated in common units as the number of hydrogen (in liters), evolved from one gram aluminum per second. It also shows the values of the time during which the complete oxidation of aluminum, added to the reactor during the experiment, occurs.

TABLE 3

Values of specific rate of reaction for a set of aluminum powder fractions

| No | Grade of Al powder | Mean size of particles, mcm | Concentration of NaOH, mol. % | Time of reaction, c | Specific rate of reaction, l/g-s |
|---|---|---|---|---|---|
| 1 | ASD-6 | 8 | — | 60 | 0.21 |
| 2 | ASD-6 | 8 | 0.05 | 51 | 0.25 |
| 3 | ASD-6 | 8 | 1.0 | 45 | 0.32 |
| 4 | ASD-4 | 14 | — | 315 | 0.05 |
| 5 | ASD-4 | 14 | 0.05 | 130 | 0.1 |
| 6 | ASD-4 | 14 | 0.1 | 66 | 0.18 |
| 7 | ASD-1 | 34 | — | 670 | 0.015 |
| 8 | ASD-1 | 34 | 0.05 | 340 | 0.05 |
| 9 | ASD-1 | 34 | 0.1 | 160 | 0.08 |

Analysis of the obtained results shows that the introduction of the catalyst in the reactants greatly increases the rate of reaction between aluminum and water in a reactor at the temperature range of T=300-650° C. and pressure P=10-17 MPa, moreover the effect of the catalyst is stronger for coarse powders. Thus, when introducing microadditive of the catalyst it becomes possible to use this method for producing aluminum hydroxide and hydrogen using aluminum powders of larger fractions −60 microns.

Addition of such a catalyst in small quantities has practically no effect on the quality of the resulting boehmite. This can be explained by the fact that the reaction of aluminum with water in the preparation of aluminum hydroxide in the form of boehmite is produced with a large excess of water (the ratio of the starting components $Al/H_2O=1/7-1/8$). The formation of its own boehmite requires approximately 10% of the available water in the reactor, and therefore the main part of the dissolved catalyst is derived with water vapor, which is about 90 weight % of the introduced into the reactor slurry. As a result, the content of Na in the boehmite is not more than 0.02 wt. %, which is acceptable for most areas of its application.

Adjusting the catalyst feed to the mixer 9 is used for changing the preparation conditions of the slurry (grade of powder used, the catalyst concentration in the slurry).

In addition to the chemical purity, the most important characteristic of aluminum hydroxide (boehmite), which determines the breadth of its use and value, is the degree of crystallinity. In many applications of the boehmite (adsorbents, catalysts, filter elements, as a component in powder metallurgy, etc.) only fully crystallized boehmite is used.

To achieve complete crystallization of the resulting boehmite its exposure for a certain time in the reactor prior to the output to receptacle is required. This process is carried out with the same parameters of the reactor (T=650-300° C. and a pressure of P=10-17 MPa) under which there is a reaction between aluminum and water. The time during which the final oxidation of the aluminum and complete crystallization of boehmite occurs, depends on the particle size of the aluminum powder included in the composition of the starting slurry feeding to the reactor. Table 4 shows experimentally determined values of the total dwell time of the reaction products after the completion of feed of starting slurry to the reactor necessary for the final oxidation of the aluminum particles and complete crystallization of boehmite for different aluminum powder.

TABLE 4

Dwell time for different grades of aluminum powders

| Grade of Al powder | Dwell time, s | |
|---|---|---|
| | Without additions of catalyst | With catalyst 0.05% M |
| ASD-6 | 110 | 75 |
| ASD-4 | 320 | 110 |
| ASD-1 | 670 | 215 |

For continuous operation of the installation at least one additional reactor is introduced into the flow chart. The number of additional reactors is determined by the total time of feed of the starting components and the duration of exposure for aluminum oxidation and crystallization of the boehmite, that is, the particle size of the using powder of aluminum.

Figure 5:
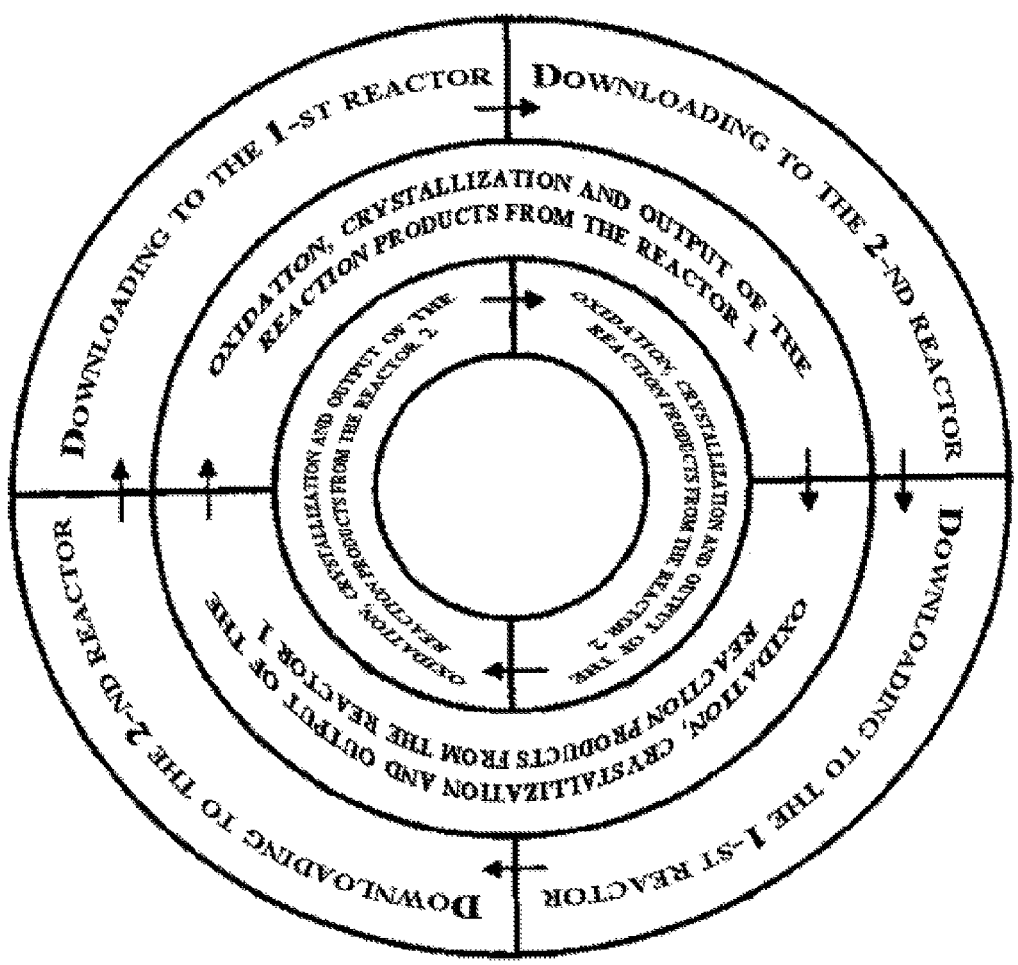
FIG. 5 shows the sequence of processes in the installation according to a specific configuration of the invention.

The basis of the method is the multiple repetition of cycle of sequential injection of the initial slurry to the $1^{st}$ and $2^{nd}$ reactors (see FIG. 5). Duration of injection into each reactor is the same and is selected so that the oxidation of aluminum, the formation of boehmite, its crystallization and output in each of the reactors are completed before the resumption of feeding the initial suspension to it.

Download of starting aqueous aluminum slurry from reactor 21 starts and lasts for a certain time, during which the process of oxidation of aluminum with formation of boehmite and releasing of hydrogen begins. After the completion of the feed to the $1^{st}$ reactor aqueous slurry of aluminum begins to flow into the $2^{nd}$ reactor. Upload time of slurry to the $2^{nd}$ reactor has the same duration as the time of feeding to the $1^{st}$ one.

Meanwhile in the $1^{st}$ reactor additional oxidation of injected therein aluminum continues, crystallization of formed boehmite during a certain time and its output is performed. After output of boehmite from the $1^{st}$ reactor feed of the starting slurry which at this moment was made to the $2^{nd}$ reactor is switched back to the $1^{st}$ reactor. At this time in the $2^{nd}$ reactor the additional oxidation of aluminum, which have come since the start of injection of the initial slurry to this reactor, the crystallization of formed in it boehmite for some time and its output, occur, that is, processes similar to those that occurred in the $1^{st}$ reactor. From the resumption of the slurry to the $1^{st}$ reactor described above process sequence starts again, which ensures the continuity of plant operation.

As the results of X-ray analysis show, the oxidation reaction product of aluminum powders is completely crystallized boehmite without admixtures of other forms of aluminum hydroxide and oxide.

The results of studies of physical and chemical properties of powders of boehmite obtained in this manner are shown in Table 5.

TABLE 5

Physical and chemical properties of boehmite

| Denomination | Value |
|---|---|
| 1 Appearance | High-dispersive powder of white color |
| 2 Crystal structure | Boehmite |
| 3 Crystal size, no more | 1000 |
| 4 Impurity index on ignition basis, %, no more | |
|    Silicone dioxyde ($SiO_2$) | 0.05 |
|    Iron oxide ($Fe_2O_3$) | 0.05 |
|    Sodium oxide ($Na_2O$) | 0.05 |
| 5 Water content, %, no more | 1.5 |
| 6 True specific gravity, g/cm$^3$, no more | 3.06 |
| 7 Bulk density, kg/m$^3$, no more | 600 |
| 8 Weight loss on ignition basis (at temperature no more 1100° C.), %, no more | 17 |
| 9 Specific particular density, m$^2$/g, within | 40-100 |
| 10 Electric conductivity of aqueous extract, μsm/sm, no more | 200 |
| 11 pH index of water slurry, no more | 9 | in the process of testing of an experimental process plant the total quantity of hydrogen is fully consistent with the values calculated by reference to the amount of released to the reactors aluminum powders. In the composition of the hydrogen there is (see Table 6), a small amount of impurities contained in the aluminum and water, and appear to be evolved by the reaction of their interaction. Humidity of hydrogen will be determined by the type of used drying column.

TABLE 6

Results of mass spectrometric analysis of chemical composition of gas sample

| Composition of gas sample (components) | Volume content of components, % |
|---|---|
| Hydrogen ($H_2$) | 99.95 |
| Sum ($Na_2$ + CO)* | 0.04 |
| Carbon dioxide ($CO_2$) | 0.01 |
| Argon (Ar) | 0.01 |
| Oxygen($O_2$) | 0.01 |
| Water vapors ($H_2O$)** | — |

It should be noted that the developed method is characterized by wastelessness, manufacturability, high performance, and environmental safety. Use of the catalyst, the introduction into the process step of final oxidation of aluminum and crystallization of boehmite ensures receiving of nanocrystalline structure of boehmite, high purity of aluminum powders with particle size up to 60 microns, the intensive evolution of hydrogen. When applying at least one additional reactor, process continuity is achieved. The stability and reliability of the reactor is provided by means of monitoring its state (temperature and pressure sensors) and by control of the controller connected with the computer of a higher level.

The invention claimed is:

1. A method of hydrothermal processing of highly toxic substances, wastes and metal powders, the method comprising
   a batch processing cycle of at least following steps i. to viii;
   i. preparing a batch of highly toxic waste, substances and metal powders for processing;
   ii. applying precision dozing to the batch to obtain a mixture of the batch with water and at least one additional reagent in preset proportions;
   iii. feeding the mixture into a reactor;
   iv. spraying the mixture inside the reactor with a mechanical spray nozzle;
   v. supplying an additional oxidizing agent inside the reactor;
   vi. adjusting a temperature inside the reactor to above 374.2° C.;
   vii. adjusting a pressure inside the reactor to above 21.8 MPa, thereby driving the water into supercritical condition and initiating a supercritical hydrothermal oxidation process;
   viii. keeping the mixture in the reactor for a preset amount of time, and at the same time
      removing a produced steam and hydrogen mixture from the reactor via a steam-gas unit and droplet separator into a wastewater condenser unit and a gas drainage pipe, and
      venting suspended solids through a bottom part of the reactor into a solids collector unit;
   repeating the batch processing cycle after it has terminated; and
   monitoring and controlling the temperature and pressure inside the reactor via an Automatic Process Control System (APCS) during all steps.

2. The method according to claim 1 wherein the mixture of processed substances comes as a suspension, emulsion or solution.

3. The method according to claim 1 wherein an alkali solution is added as the at least one additional reagent to the reactor, in order to bind an acid product produced during the supercritical hydrothermal oxidation process.

4. The method according to claim 1 wherein air or hydrogen peroxide, or an air/hydrogen peroxide mixture is supplied as the additional oxidizing agent.

5. The method according to claim 1 wherein the steps of feeding the mixture together with the at least one additional reagent and the water, the supplying of the additional oxidizing agent and the removing of the produced steam and hydrogen mixture are constantly performed.

6. The method according to claim 1 wherein the steam-gas unit is a combined cycle unit in order to obtain electrical and thermal power.

7. The method according to claim 1 wherein the temperature inside the reactor and the pressure inside the reactor are maintained by adding cold water to the reactor, stopping the process of feeding the mixture and the additional oxidizing agent in case the temperature or pressure exceed the preset values or heating the reactor by an external electrical heaters if the temperature or pressure become too low.

8. The method according to claim 1 further wherein the batch of highly toxic waste, substances and metal powders is a batch of powdered aluminium and the at least one additional reagent is an alkali metal hydroxide in a preset proportion not more than 0.1 M.

9. The method according to claim 8 wherein during the preset amount of time, the mixture is allowed to a final oxydation of the powdered aluminium into crystalline aluminium hydroxyl as bohemite.

10. The method according to claim 8, wherein for a continuous process, at least one auxiliary reactor is used, wherein the step of spraying the mixture is conducted altenatively in the high pressure reactor and the auxiliary reactors at an interval of time equal or longer to the preset amount of time.

11. The method according to claim 8 wherein the temperature inside the reactor is below 650° C.

12. An equipment for hydrothermal processing of highly toxic substances, waste and metal powders comprising
   a reactor;
   an internal pipe located in the reactor;
   a top cover of the reactor;
   a bottom cover of the reactor opposite to the top cover;
   at least a first vessel with highly toxic substances and wastes,
   at least a second vessel with additional reagents;
   at least a third vessel with water;
   a plurality of dosage units;
   a mixer which is operationally connected to the plurality of dosage units for using the dosage units to prepare a mixture to be processed of highly toxic substances, wastes and metal powders, additional reagents and water,
   a feeding dosage pump which feeds the mixture under high pressure into the internal pipe;
   a mechanical nozzle configured to spray the mixture pumped into the internal pipe;
   a hydrogen peroxide vessel;
   a dozing pump connected to the hydrogen peroxide vessel to pump hydrogen peroxide into the reactor;
   a compressed air receiver for operating valves;
   a second receiver which is used to supply air into the reactor through a nozzle located in the top cover of the reactor;
   a compressor which pumps ambient air into the compressed air receiver and into the second receiver;
   a nipple located in the top cover, for discharging a mixture of steam and gas;
   a combined cycle unit;
   a droplet separator configured to separate a gas mixture into condensed water and a humid gas;
   the nipple being connected to the combined cycle unit and the droplet separator such that the mixture goes through a first valve and through the combined cycle unit and in the droplet separator where it is separated into condensed water which goes to a condensate collector and the humid gas mixture which is discharged through a drainage pipe into the atmosphere;
   a second nipple and a second valve located on the bottom cover, for removing suspended solids from the reactor and guiding the suspended solids to be collected in a solids collector unit;
   whereby the droplet separator is further configured to discharge fumes that are separated from the suspended solids, into the atmosphere and condensates are collected in the condensate collector unit,
   whereby the reactor is made to withstand temperatures above 374.2° C. and pressures above 21.8 MPa which allow water to enter the supercritical state,
   the equipment further being equipped with an Automated Monitoring and Control System (AMCS) which is configured to monitor a feed pressure, temperature and pressure inside the reactor, pump and valve operation.

13. The equipment according to claim 12 wherein the reactor has several internal pipes.

14. The equipment according to claim 12 wherein several reactors working in parallel are used to increase productivity.

15. The equipment according to claim 14 wherein the batch processing is started at a preset time intervall in the several reactors working in parallel.

16. A reactor for hydrothermal processing of highly toxic substances, waste and metal powders comprising
- a cylinder-shaped chamber with a top cover and a bottom cover attached to the cylinder through O-ring seals;
- at least one internal pipe located inside the chamber, in which hydrothermal processing of the highly toxic substances, the waste and the metal powders takes place;
- at least one nozzle for injecting the highly toxic substances, the waste and the metal powders, as well as an additional reagent and water inside the chamber;
- at least one further nozzle for feeding an additional oxidizing agent into the chamber;
- a first nipple for discharging gaseous products of the oxidizing process; and
- a first temperature sensor installed in the top cover;
- a second nipple for discharging suspended solids, installed in the bottom cover; and
- a second temperature sensor installed in the bottom;
- at least a pressure sensor;
- the top cover and bottom cover being equipped with thermal insulated housings;
- at least a heater located on an outer surface of the chamber; and
- wherein the first and the second temperature sensors are located on the outer surface of the chamber.

17. The reactor according to claim 15 wherein the reactor chamber has several internal pipes.

* * * * *